United States Patent
Taylor et al.

(10) Patent No.: US 7,346,331 B2
(45) Date of Patent: Mar. 18, 2008

(54) POWER MANAGEMENT FOR LOCKING SYSTEM

(75) Inventors: Ronald Taylor, Wheaton, IL (US); James F. Wiemeyer, Homer Glen, IL (US)

(73) Assignee: Harrow Products, LLC, Montvale, NJ (US)

(*) Notice: Subject to any disclaimer, the term of this patent is extended or adjusted under 35 U.S.C. 154(b) by 802 days.

(21) Appl. No.: 10/262,194

(22) Filed: Sep. 30, 2002

(65) Prior Publication Data

US 2003/0098777 A1 May 29, 2003

Related U.S. Application Data

(60) Provisional application No. 60/326,338, filed on Sep. 30, 2001, provisional application No. 60/326,299, filed on Sep. 30, 2001, provisional application No. 60/326,201, filed on Sep. 30, 2001, provisional application No. 60/326,316, filed on Sep. 30, 2001, provisional application No. 60/326,298, filed on Sep. 30, 2001, provisional application No. 60/326,179, filed on Sep. 30, 2001, provisional application No. 60/326,296, filed on Sep. 30, 2001, provisional application No. 60/326,294, filed on Sep. 30, 2001, provisional application No. 60/326,295, filed on Sep. 30, 2001.

(51) Int. Cl.
*H04B 1/16* (2006.01)

(52) U.S. Cl. .............................. 455/343.5; 455/343.1; 455/343.3; 455/334; 455/230; 455/298; 455/299; 340/5.61; 340/5.1; 340/5.31; 340/825.38; 340/825.4; 340/825.43

(58) Field of Classification Search ................ 455/403, 455/408, 411, 426.1, 343.1–343.5, 343.6, 455/404.1, 334, 230, 298, 299, 344, 343; 370/328, 401, 466; 340/636.1, 637, 660–661, 340/663, 664, 5.61, 5.2, 5.1, 5.31, 825.38, 340/825.4, 825.43; 320/134–136
See application file for complete search history.

(56) References Cited

U.S. PATENT DOCUMENTS 528,589 A    11/1894    Brownell et al.

(Continued)

FOREIGN PATENT DOCUMENTS

FR    2749607    12/1997

(Continued)

OTHER PUBLICATIONS

"Circuit Design for Electronic Instrumentation" by Darold Wobschall, pp. 367-369.

*Primary Examiner*—Rafael Perez-Gutierrez
*Assistant Examiner*—Khai Nguyen
(74) *Attorney, Agent, or Firm*—Michael Best & Friedrich LLP (57) ABSTRACT

In an access control system, a method and system for power management. A method of power management in a wireless access control system includes monitoring usage of a transceiver in a remote access point in a wireless access control system, de-activating the transceiver when the transceiver is not in use, and re-activating the transceiver upon occurrence of a predefined event. Additionally, the method may include transmitting a warning signal when an energy level of a power supply associated with the transceiver is below a predetermined threshold. The method may further include locking the remote access point when an energy level of a power supply associated with the transceiver is below a predetermined threshold. The remote access point may be locked until the energy level is above the predetermined threshold.

27 Claims, 7 Drawing Sheets

U.S. PATENT DOCUMENTS

| | | |
|---|---|---|
| 1,946,384 A | 2/1934 | Baril et al. |
| 3,967,478 A | 7/1976 | Guinn |
| 4,048,630 A | 9/1977 | Deming et al. |
| 4,357,601 A | 11/1982 | McWilliams |
| 4,539,555 A | 9/1985 | Tefka |
| 4,557,121 A | 12/1985 | Charlton |
| 4,579,376 A | 4/1986 | Charlton |
| 4,634,155 A | 1/1987 | Geringer et al. |
| 4,672,365 A | 6/1987 | Gehman et al. |
| 4,677,834 A | 7/1987 | Hicks |
| D306,806 S | 3/1990 | Hill |
| 4,967,478 A | 11/1990 | Sherman |
| 5,009,456 A | 4/1991 | Eck |
| 5,019,803 A * | 5/1991 | Maram .................. 340/539.3 |
| 5,075,608 A | 12/1991 | Erdman et al. |
| 5,095,654 A | 3/1992 | Eccleston |
| 5,148,691 A | 9/1992 | Wallden |
| 5,184,349 A | 2/1993 | Riordan |
| 5,263,347 A | 11/1993 | Allbaugh et al. |
| 5,308,131 A | 5/1994 | Galindo et al. |
| 5,313,812 A | 5/1994 | Eklund et al. |
| 5,410,444 A | 4/1995 | Juds |
| 5,418,839 A | 5/1995 | Knuth et al. |
| RE35,124 E | 12/1995 | Erdman et al. |
| 5,475,375 A | 12/1995 | Barrett et al. |
| 5,479,151 A | 12/1995 | Lavelle et al. |
| 5,491,471 A | 2/1996 | Stobbe |
| 5,497,411 A | 3/1996 | Pellerin |
| 5,531,086 A | 7/1996 | Bryant |
| 5,577,229 A | 11/1996 | Wakerly |
| 5,600,323 A * | 2/1997 | Boschini .................. 341/173 |
| 5,602,536 A | 2/1997 | Henderson et al. |
| 5,608,298 A | 3/1997 | Frolov et al. |
| 5,611,582 A | 3/1997 | Frolov et al. |
| 5,630,169 A | 5/1997 | Jackson |
| 5,682,135 A | 10/1997 | LaBonde et al. |
| 5,683,127 A | 11/1997 | Chamberlain |
| 5,705,991 A | 1/1998 | Kniffin et al. |
| 5,722,276 A | 3/1998 | Aigner et al. |
| 5,729,198 A | 3/1998 | Gorman |
| 5,769,472 A | 6/1998 | Small |
| 5,774,059 A | 6/1998 | Henry et al. |
| 5,791,178 A | 8/1998 | Chamberlain et al. |
| D397,993 S | 9/1998 | Jimenez |
| 5,808,296 A | 9/1998 | McMonagle et al. |
| 5,812,782 A | 9/1998 | Jackson |
| 5,847,662 A | 12/1998 | Yokota et al. |
| 5,867,095 A | 2/1999 | Klein et al. |
| 5,881,055 A | 3/1999 | Kondo |
| 5,884,145 A | 3/1999 | Haartsen |
| 5,901,361 A | 5/1999 | Luong |
| 5,933,086 A | 8/1999 | Tischendorf et al. |
| 5,936,544 A | 8/1999 | Gonzales et al. |
| 5,940,771 A | 8/1999 | Gollnick et al. |
| 5,941,106 A * | 8/1999 | Williamson et al. ....... 70/278.1 |
| 5,974,367 A | 10/1999 | Bianco |
| 6,021,477 A | 2/2000 | Mann |
| 6,035,676 A | 3/2000 | Hudspeth |
| 6,038,896 A | 3/2000 | Chamberlain et al. |
| 6,067,297 A | 5/2000 | Beach |
| 6,076,385 A | 6/2000 | Pedroso et al. |
| 6,108,188 A | 8/2000 | Denison et al. |
| 6,160,490 A * | 12/2000 | Pace et al. .................. 340/7.37 |
| 6,167,251 A * | 12/2000 | Segal et al. .................. 455/406 |
| 6,167,934 B1 | 1/2001 | Debroche |
| 6,185,415 B1 | 2/2001 | Boatwright |
| 6,189,351 B1 | 2/2001 | Eagan et al. |
| 6,212,175 B1 | 4/2001 | Harsch |
| 6,237,028 B1 | 5/2001 | Jackson |
| 6,259,352 B1 | 7/2001 | Yulkowski et al. |
| 6,260,392 B1 | 7/2001 | Geiger |
| 6,285,295 B1 | 9/2001 | Casden |
| 6,297,725 B1 | 10/2001 | Tischendorf et al. |
| 6,326,754 B1 | 12/2001 | Mullet et al. |
| 6,330,817 B1 | 12/2001 | Frolov |
| 6,347,486 B1 | 2/2002 | Badillet |
| 6,352,202 B2 | 3/2002 | Takiguchi et al. |
| 6,359,547 B1 | 3/2002 | Denison et al. |
| 6,377,608 B1 * | 4/2002 | Zyren .................. 375/132 |
| 6,392,537 B1 | 5/2002 | Tazumi et al. |
| 6,397,061 B1 * | 5/2002 | Jordan et al. ................ 455/421 |
| RE37,784 E | 7/2002 | Fitzgibbon et al. |
| 6,434,985 B1 | 8/2002 | Walmsley |
| 6,486,793 B1 * | 11/2002 | Buccola .................. 340/5.2 |
| 6,512,465 B2 * | 1/2003 | Flick .......................... 340/989 |
| 6,606,490 B1 * | 8/2003 | Rainish et al. ........... 340/10.34 |
| 6,624,750 B1 | 9/2003 | Marman et al. |
| 6,657,976 B1 | 12/2003 | Larghi |
| 6,665,520 B2 | 12/2003 | Romans |
| 6,714,118 B1 | 3/2004 | Frolov et al. |
| 6,776,332 B2 * | 8/2004 | Allen et al. .................. 235/380 |
| 6,778,099 B1 | 8/2004 | Meyer et al. |
| 6,828,902 B2 | 12/2004 | Casden |
| 6,879,259 B1 * | 4/2005 | Smith et al. ............. 340/636.1 |
| 6,956,840 B1 | 10/2005 | Proctor, Jr. |
| 6,958,976 B2 | 10/2005 | Kikkawa et al. |
| 2001/0021639 A1 | 9/2001 | Kaku |
| 2001/0055283 A1 * | 12/2001 | Beach ........................ 370/328 |
| 2002/0163430 A1 * | 11/2002 | Bergman et al. ............ 340/531 |
| 2002/0177473 A1 * | 11/2002 | Skinner et al. ............. 455/573 |
| 2002/0180582 A1 | 12/2002 | Nielsen |
| 2003/0025082 A1 | 2/2003 | Brewington et al. |
| 2003/0052648 A1 * | 3/2003 | Hara et al. .................. 320/132 |
| 2003/0096607 A1 | 5/2003 | Taylor |
| 2003/0098778 A1 | 5/2003 | Taylor et al. |
| 2003/0098779 A1 | 5/2003 | Taylor et al. |
| 2003/0100266 A1 * | 5/2003 | Wiemeyer et al. ......... 455/67.3 |
| 2003/0103472 A1 | 6/2003 | Taylor et al. |
| 2003/0143956 A1 | 7/2003 | Taylor |
| 2004/0099723 A1 * | 5/2004 | Robertson .................. 235/375 |
| 2004/0236547 A1 | 11/2004 | Rappaport et al. |
| 2005/0003812 A1 * | 1/2005 | Gladwin et al. ......... 455/426.1 |

FOREIGN PATENT DOCUMENTS

| | | |
|---|---|---|
| WO | WO 02/25040 | 3/2002 |

* cited by examiner

POWER MANAGEMENT FOR LOCKING SYSTEM

RELATED APPLICATIONS

The present application claims priority to the following provisional Applications, all filed Sep. 30, 2001: Application Ser. No. 60/326,338, entitled "RF Channel Linking Method and System"; Application Ser. No. 60/326,299, entitled "Energy Saving Motor-Driven Locking Subsystem"; Application Ser. No. 60/326,201 entitled "Cardholder Interface for an Access Control System"; Application Ser. No. 60/326,316, entitled "System Management Interface for Radio Frequency Access Control"; Application Ser. No. 60/326,298 entitled "Power Management for Locking System"; Application Ser. No. 60/326,179, entitled "General Access Control Features for a RF Access Control System"; Application Ser. No. 60/326,296, entitled "RF Wireless Access Control for Locking System"; Application Ser. No. 60/326,294, entitled "Maintenance/Trouble Signals for a RF Wireless Locking System"; and Application Ser. No. 60/326,295, entitled "RF Dynamic Channel Switching Method."

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The preferred embodiments of the present invention relate to an RF access control system for controlling access to an access point. More specifically, the preferred embodiments of the present invention relate to a system and method for power management and configuration.

A wireless access control system may provide several advantages over a traditional, wire-based access control system. In a traditional, wired access control system, each access point, such as a door, for example, is equipped with a locking module to secure the access point. Each locking module is in turn directly wired to a remote access control module. The access control module is typically a database that compares a signal received from the locking module to a stored signal in the database in order to determine an access decision for that locking module. Once the access decision has been determined by the access control module, the decision is relayed to the locking module through the wired connection.

The use of wired connections between the access control module and the locking module necessitates a large investment of time and expense in purchasing and installing the wires. For example, for larger installations, literally miles of wires must be purchased and installed. An access control system that minimizes the time and expense of the installation would be highly desirable.

Additionally, wire-based systems are prone to reliability and security failures. For example, a wire may short out or be cut and the locking module connected to the access control module by the wire may no longer be under the control of the access control module. If a wire connection is cut or goes, the only alternative is to repair the faulty location (which may not be feasible) or run new wire all the way from the access control module to the locking module, thus incurring additional time and expense. Conversely, an access control system that provides several available communication channels between the locking module and the access control module so that if one communication channel is not usable, communication may proceed on one of the other communication channels, would also be highly desirable, especially if such an access control system did not add additional costs to install the additional communication channels.

A wireless access system providing a wireless communication channel between the locking module and the access control module may provide many benefits over the standard, wire-based access control system. Such a wireless access system is typically less expensive to install and maintain due to the minimization of wire and the necessary installation time. Additionally, such a system is typically more secure because communication between the locking module and the access control module is more robust that a single wire.

However, one difficulty often encountered in installing and maintaining such a wireless access system is power management. For example, systems may rapidly consume power and diminish battery life. Wireless system components may operate on relatively high power and quickly drain batteries.

Consequently, system components may be prone to power failures and errors in system function due to diminished battery life. Frequent battery replacement may be needed to sustain proper system function. A system that minimizes power consumption would be highly desirable. Additionally, a system that extends the battery life of system components would be highly desirable.

BRIEF SUMMARY OF THE INVENTION

Preferred embodiments of the present invention provide a method and system for power management in an access control system. The RF access control system includes a power supply in a remote reader device having an energy level and a processor monitoring the energy level of the power supply, the processor initiating a warning signal when the energy level of the power supply is below a predetermined threshold. The warning signal may be transmitted to a remote access control panel for display to an operator. The warning signal may also trigger locking of the remote reader device. The remote reader device may be locked until the energy level is above the predetermined threshold. The system may further include an override to access the locked remote reader device. The system may also include at least two predetermined thresholds, including a warning threshold and a locking threshold.

The system processor may de-activate the remote reader device when the remote reader device is not in use. The processor may de-activate a transceiver in the remote reader device when the transceiver is not in use or the energy level is below the predetermined threshold. The process may then activate the transceiver upon a predefined event. The processor may also report power supply status information to a remote access control panel.

A method of power management in a wireless access control system includes monitoring usage of a transceiver in a remote access point in a wireless access control system, de-activating the transceiver when the transceiver is not in use, and re-activating the transceiver upon occurrence of a predefined event. The predefine event includes a request to enter, a request to exit, a card insertion, a heartbeat, a time interval, a change in state, and/or an emergency beacon. The method may also include monitoring the de-activated transceiver to detect occurrence of the predefined event. The method may also include transmitting an access request from the transceiver to an access control panel.

Additionally, the method may include transmitting a warning signal when an energy level of a power supply associated with the transceiver is below a predetermined threshold. The method may further include locking the remote access point when an energy level of a power supply associated with the transceiver is below a predetermined threshold. The remote access point may be locked until the energy level is above the predetermined threshold. An override allows access to said locked remote access point. The method may include at least two predetermined thresholds including a warning threshold and a locking threshold. The method may further include reporting power supply status information and/or transceiver usage information to an access control panel.

DETAILED DESCRIPTION OF THE INVENTION

The present application is directed toward a portion of a wireless access system. Additional disclosure of the wireless access system may be found in the following co-filed applications which are hereby incorporated by reference in their entirety: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,509, entitled "Cardholder Interface for an Access Control System" filed Sep. 30, 2002; application Ser. No. 10/262,196, entitled "System Management Interface for Radio Frequency Access Control" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application Ser. No. 10/262,508, entitled "Maintenance/Trouble Signals for a RF Wireless Locking System" filed Sep. 30, 2002; and application Ser. No. 10/262,409, entitled "RF Dynamic Channel Switching Method" filed Sep. 30, 2002.

Figure 1:
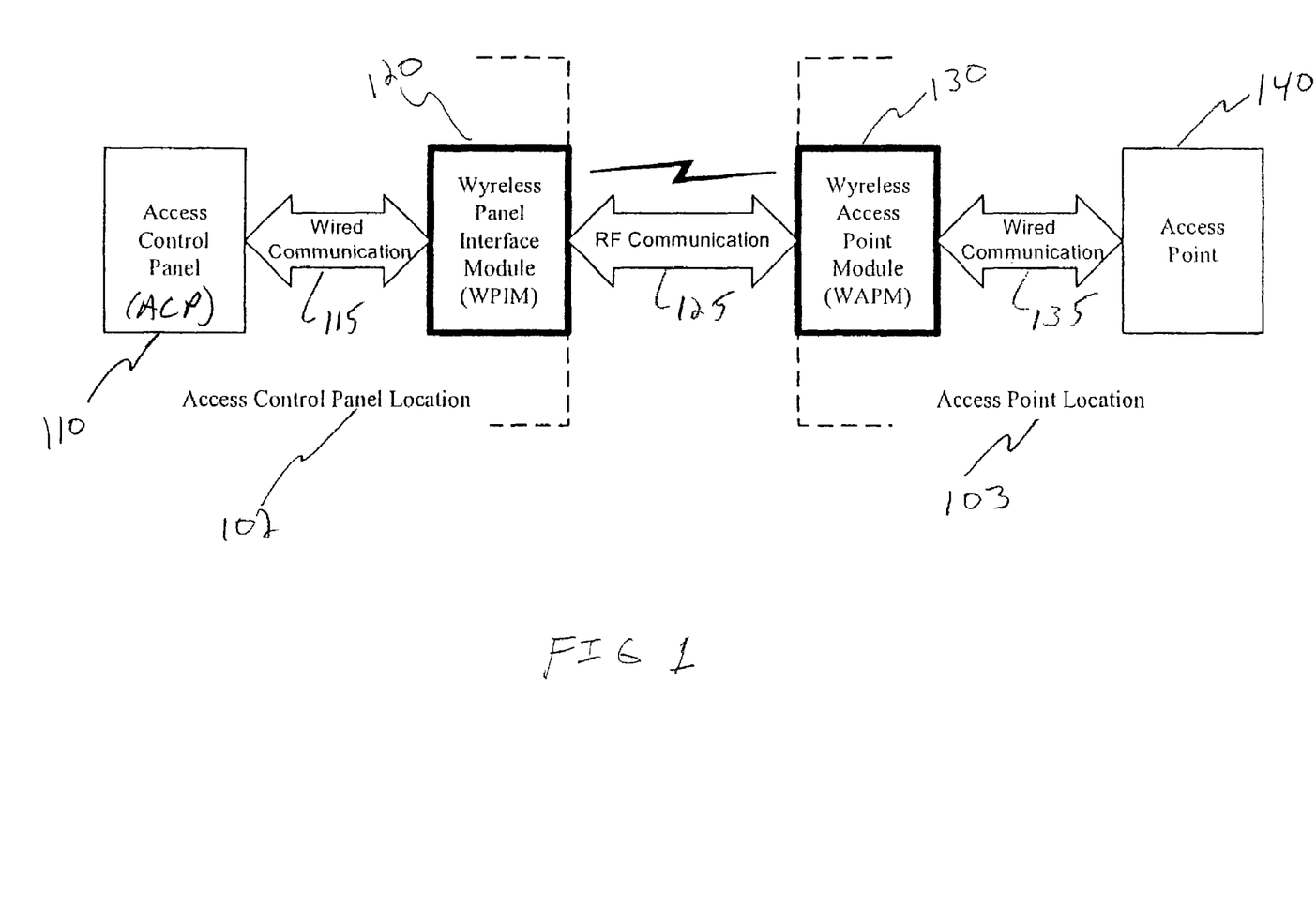
FIG. 1 illustrates a block diagram of the components of a wireless access system according to a preferred embodiment of the present invention.

FIG. 1 illustrates a block diagram of the components of a wireless access system 100 according to a preferred embodiment of the present invention. The wireless access system 100 includes several components installed at one of two generalized locations, an access control panel location 102 and an access point location 103. The access control panel location 102 includes an access control panel (ACP) 110 and a Wireless Panel Interface Module (WPIM) 120. The access point location 103 includes a Wireless Access Point Module (WAPM) 130 and an access point 140. The access control panel 110 communicates with the WPIM 120 through a bi-directional wired communication link 115. The WPIM 120 communicates with the WAPM 130 through a bi-directional RF communication link 125. The WAPM 130 communicates with the access point 140 through a bi-directional wired communication link 135. The access point 140 is preferably a door or portal, but may be a container, secure location, or a device of some kind, for example.

In operation, an access signal is read at the access point 140. The access signal may be a signal from an access card, for example, a magnetic stripe or Wiegand access card. Alternatively, the access signal may be a biometric or a numeric sequence or some other access signal. The access signal is relayed from the access point 140 to the WAPM 130 through the wired communication link 135. As further described below, the access point 140 may be integrated into the WAPM 130 to form a single component or may be a separate component wired to the WAPM 130.

Once the WAPM 130 receives the access signal from the access point 140, the WAPM 130 transmits the access signal to the WPIM 120 over the RF communication link 125. The WPIM 120 receives the access signal and relays the access signal to the ACP 110 over the wired communication link 115.

Figure 2:
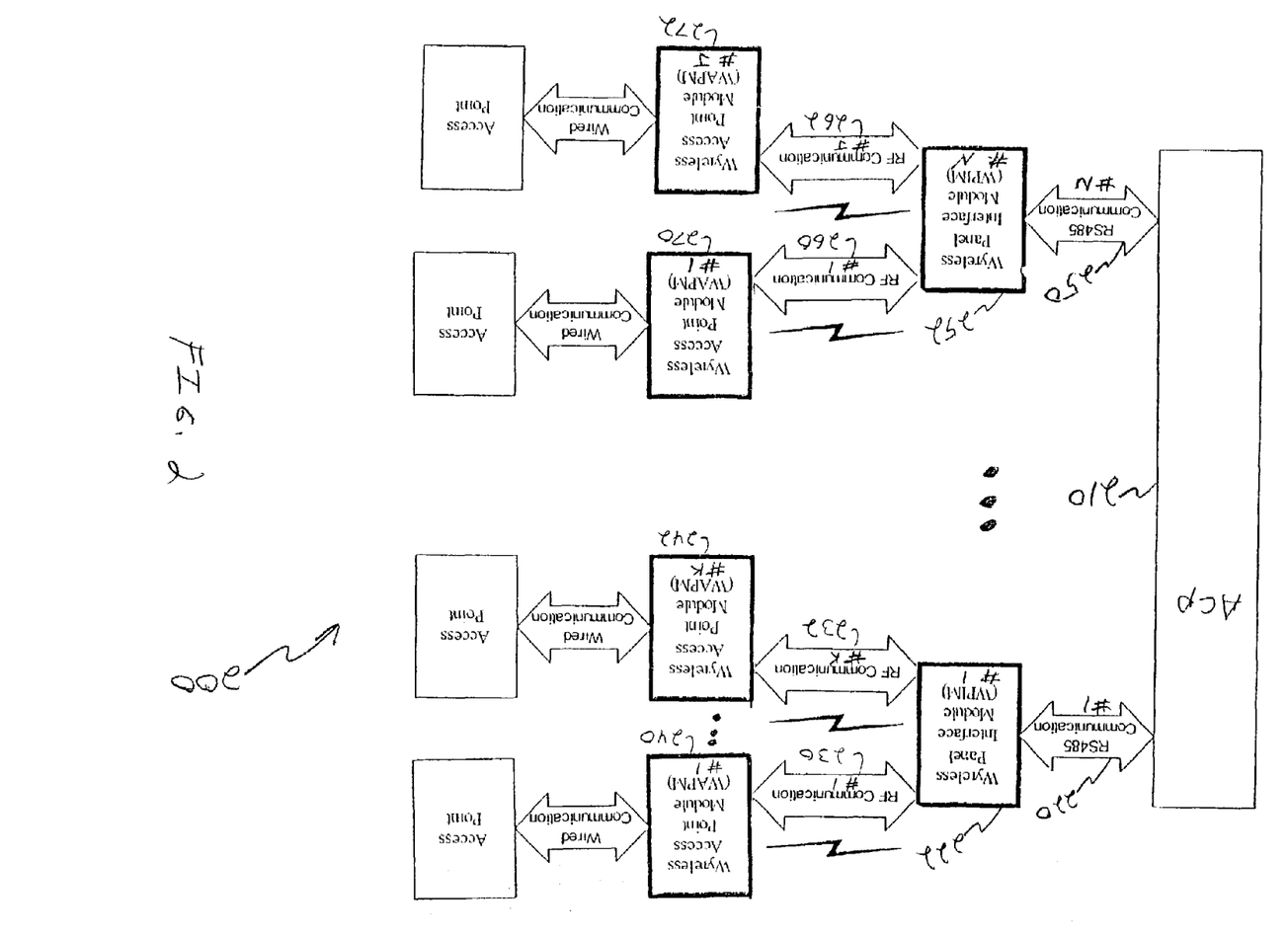
FIG. 2 illustrates a block diagram of the components of an expanded wireless access system according to a preferred embodiment of the present invention.

FIG. 2 illustrates a block diagram of the components of an expanded wireless access system 200 according to a preferred embodiment of the present invention. The expanded wireless access system 200 includes an ACP 210, multiple wired communication links 220, 222 numbered 1 to N, multiple WPIMs 222, 252 numbered 1 to N, multiple RF communication links 230, 2323, 260, 262 numbered 1 to K and 1 to J, and multiple WAPMs 240, 242, 270, 272 numbered 1 to K and 1 to J. The expanded wireless access system 200 is similar to the access system 100 of FIG. 1, and includes the same components, but has been expanded to include multiple access points, WAPMs, and WPIMs.

In the expanded wireless access system 200, a single ACP 210 communicates with a number N of WPIMs 222, 252 over a number N of wired communication links 220, 250. That is, the ACP supports communication with and provides access decisions for plurality of WPIMs 222, 252. Each WPIM 222, 252 may in turn support a plurality of WAPMs 240, 242, 270, 272 each WAPM positioned at a single access point. For example, WPIM #1 communicates with a number K of WAPMs 240, 242 over a number K of RF communication links 230, 232. Additionally, WPIM #N communicates with a number J of WAPMs 270, 272 over a number J of RF communication links 260, 262.

In a preferred embodiment, the ACP 210 supports three WPIMs and each PIM can support up to six WAPMs. However, as more advanced and configurable systems are developed, the total numbers of WPIMs and WAPMs supported is expected to rise. Additionally, the N wired communication links 220, 250 are illustrated as the preferred embodiment of RS486 communication links. Alternatively, other well-known communication protocols may be employed.

Figure 3:
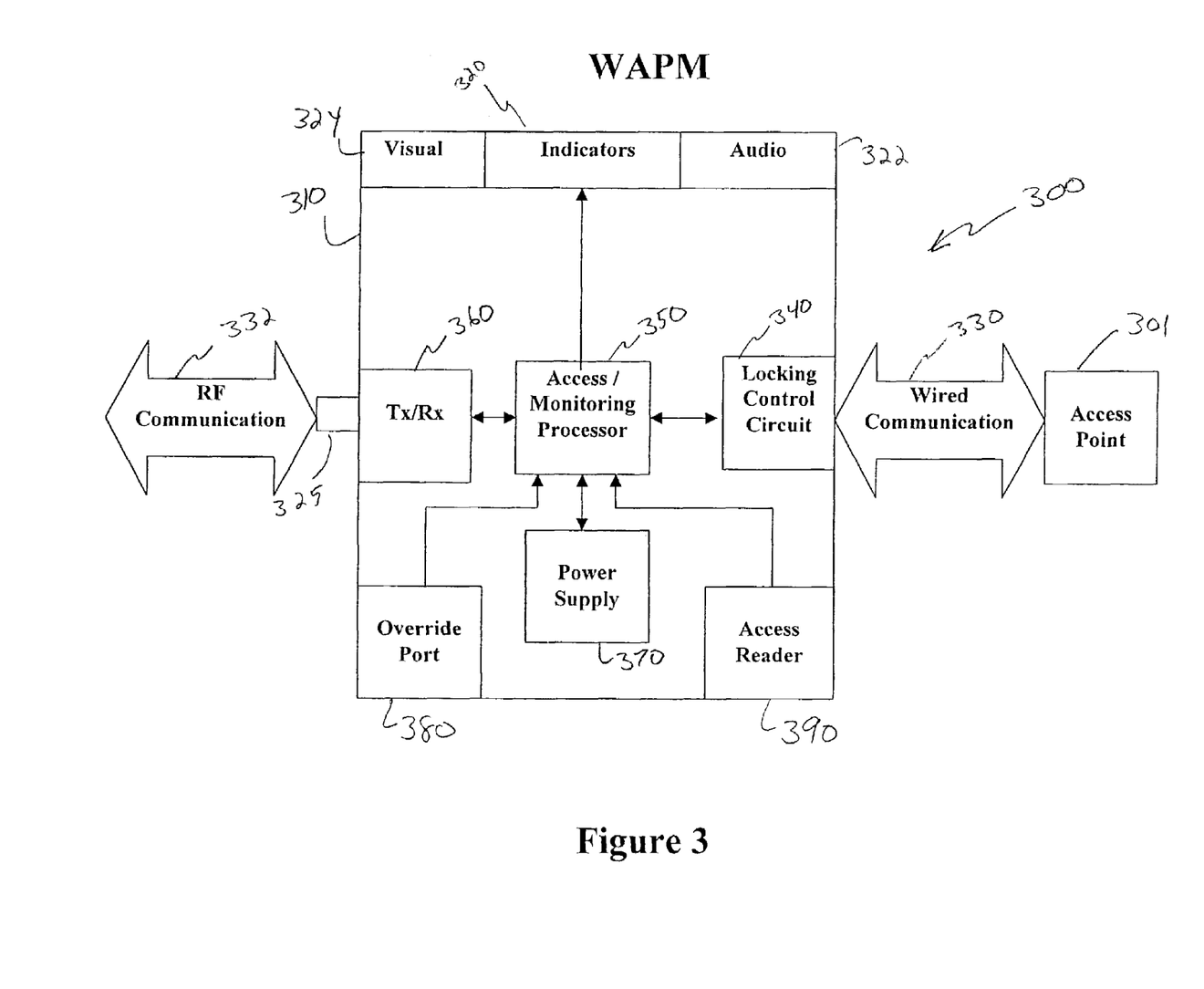
FIG. 3 illustrates a Wireless Access Point Module (WAPM) for the wireless access system of FIG. 1 according to a preferred embodiment of the present invention.

FIG. 3 illustrates a Wireless Access Point Module (WAPM) 300 for the wireless access system 100 of FIG. 1 according to a preferred embodiment of the present invention. The WAPM 300 includes a housing 310, indicators 320, a wired communication link 330, a RF communication link 332, and an antenna 325. The housing 310 includes a locking control circuit 340, an access/monitoring processor 350, a transceiver 360, a power supply 370, an override port 380, and an access reader 390. The indicators 320 may include one or both of an audio indicator 322 and a visual indicator 324. An access point 301 is also shown in FIG. 3.

The power supply 370 provides power to all of the other systems of the housing 310, including the transceiver 360, the locking control circuit 340, and the access/monitoring processor 350. The power supply 370 may be an internal battery or other internal type of power supply. Alternatively, an AC power supply may be employed. The transceiver 360 is coupled to the antenna 325 to allow signals to be sent and received from the housing 310 to an external point such as a WPIM through the RF communication link 332. The locking control circuit 340 is coupled to the access point 301 and provides locking control signals to the access point 301 through the wired communication link 330. Additionally, the locking control circuit 340 may receive feedback from the access point 301 through the wired communication link 330, for example to verify that the access point is secured. The access reader 390 receives access signals such as from an integrated card reader or other access device, for example. The indicators 320 may provide a visual or audio indication, for example of the state of the WAPM 300 or that an access signal has been read by the access reader 390.

In operation, an access signal may be received from the access reader 390. The access signal is then relayed to the access/monitoring processor 350. The access/monitoring processor 350 then sends the access signal to the transceiver 360. The transceiver 360 transmits the access signal to WPIM 120 of FIG. 1 that is interfaced to the ACP 110. As further explained below, the ACP 110 includes a database of authorized access signals. If the access signal received from the WAPM 300 is determined by the ACP 110 to be a signal corresponding to an authorized user, a confirmation is transmitted from the ACP 110 to the WPIM 120 and then to the transceiver 360 of the WAPM 300. The confirmation is relayed from the transceiver 360 to the access/monitoring processor 350. The access/monitoring processor 350 then sends a locking control signal to the locking control unit 340. When the locking control unit 340 receives the locking control signal, the locking control unit 340 activates the access point 301 through the wired communication link 330 to allow access. The indicators 320 may be a visual or audible signal that the housing 310 has read an access signal, transmitted the access signal to the remote access control panel, received a confirmation, or activated the locking member, for example.

The WAPM 300 may include several variations. For example, the WAPM may be an Integrated Reader Lock (IRL), a Wireless Reader Interface (WRI), a Wireless Integrated Strike Interface (WISI), a Wireless Universal Strike Interface (WUSI), or a Wireless Portable Reader (WPR). The IRL includes an integrated access reader and lock. That is, the IRL is similar to FIG. 3, but includes the access point as part of the housing. The WRI is similar to the IRL, but does not include an integrated access reader and instead receives signals from a third party access reader. The WISI includes an integrated reader and lock and is mounted directly into the strike of the access point, such as a door, for example. The WUSI is similar to the WISI, but does not include an integrated reader and lock and may instead be connected to a third party reader and/or lock. The WPR is a portable reader that may be taken to a remote location and determine access decisions at the remote location, for example, for security checks or badging checks.

Figure 4:
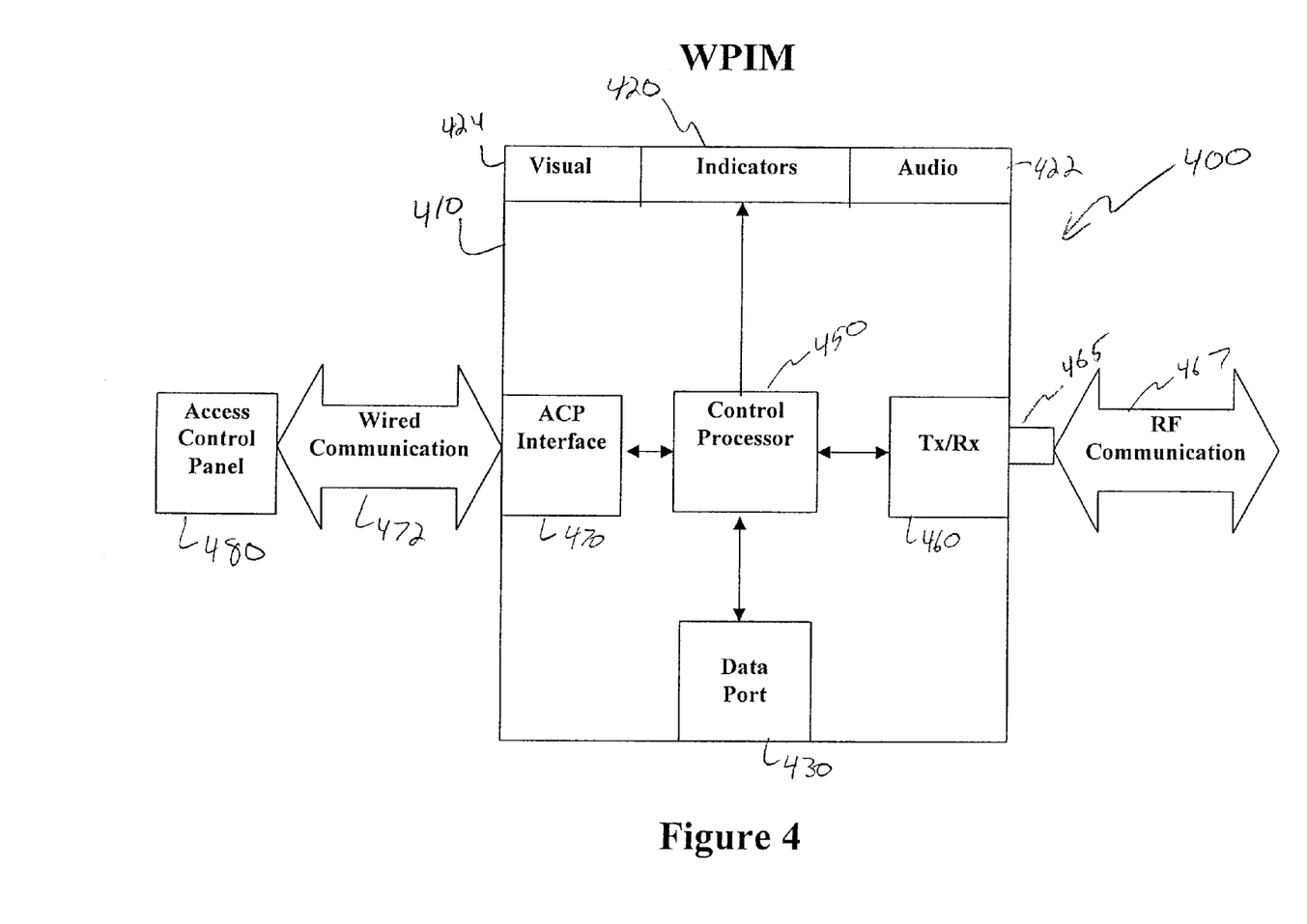
FIG. 4 illustrates a WPIM for the wireless access system of FIG. 1 according to a preferred embodiment of the present invention.

FIG. 4 illustrates a WPIM 400 for the wireless access system 100 of FIG. 1 according to a preferred embodiment of the present invention. The WPIM 400 includes a housing 410, an antenna 465, and indicators 420. The housing 410 includes a data port 430, a control processor 450, a transceiver 460 and an ACP interface 470. FIG. 4 also shows an RF communication link 467, a wired communication link 472, and an ACP 480.

Power is typically supplied to the WPIM via an AC power supply or through the wired communication 472. The transceiver 460 is coupled to the antenna 465 to allow signals to be sent and received from the housing 410 to an external point such as a WAPM through the RF communication link 467. The ACP 480 is coupled to the WPIM 400 through the wired communication link 472. The data port 430 is coupled to the control processor 450 to allow an external user such as a technician, for example, to interface with the control processor. The indicators 420 may provide a visual or audio indication, for example of the state of the WPIM 400 or that an access signal has been passed to the ACP 480 or an authorization passed to a WAPM 300.

In operation, the WPIM 400 receives access signals from the WAPM 300 through the antenna 465 and transceiver 460. The WPIM relays the access signals to the ACP 480 for decision making. Once the access decision has been made, the ACP 480 transmits the access decision through the wired communication link 472 to the WPIM 400. The WPIM 400 then transmits the access decision to the WAPM 300.

As mentioned above, the WPIM 400 includes a data port 430. The data port 430 is preferably an RS485 port. The data port 430 may be used, for example, by an operator to connect a computer to the WPIM 400 to perform various tasks, such as configuring the WPIM 400, for example. Some exemplary WPIM items for configuration include the transmission frequency for the communication link with the WAPM 300 and the performance of the indicators 420.

Additionally, configuration information may be received by the data port 430 of the WPIM 400 and relayed to the WAPM 300 via the transceiver 460. The configuration information that is received by the WAPM 300 may then by relayed to the access/monitoring processor 350 of the WAPM 300 for implementation at the WAPM 300.

The WPIM 400 may include several variations including a panel interface module (PIM) and a panel interface module expander (PIME). As mentioned above, a single PIM may communicate with multiple WAPMs. Additionally, the housing for the PIM is preferably constructed to allow additional PIM modules to be installed in the PIM housing to form the PIME. Because the PIME includes multiple PIM modules, the PIME may service more access points.

The features of one of the preferred embodiments present power management for the wireless access system 100. In particular, the system 100 provides power management for system components such as the WAPM 300.

Thus, one aspect of a preferred embodiment of the present invention is a wireless access system 100 that employs power management to adjust operation of system components, such as the WAPM 300. As described above, the power supply 370 provides power to the WAPM 300. The power supply 370 may be contained within the housing 310 of the WAPM 300. In another embodiment, the power supply 370 may serve as a power supply input port for accepting power from an external power supply.

To ensure successful operation, the WAPM 300 monitors the present power level or energy of the power supply 370. If the energy of the power supply 370 falls too low, the power supply 370 may be unable to provide power to the components of the WAPM 300 such as the access reader 390 or the locking control circuit 340. However, the energy of the power supply 370 typically diminishes during use and may require periodic replacement.

Consequently, the access/monitoring processor 350 periodically measures the remaining energy in the power supply 370. The energy level of power supply is typically measured during transmission of data by the WAPM 300. For example, power level may be sampled during transmission of preamble data to an access request by the transceiver 360. Once the energy of the power supply 370 decreases to a certain predetermined level, the access/monitoring processor 350 of the WAPM 300 generates a "maintenance," "maintenance required," "trouble," or "warning" signal. The trouble signal may then be relayed to the transceiver 360 for transmission via the antenna 325 to a remote access control panel. The remote access control panel is preferably monitored, at least periodically, for example, by a human controller who may then replace the power supply 370 with a fresh power supply or may initiate a maintenance request. The trouble signal may also be relayed to the WPIM 400 which transmits the trouble signal to the ACP 110.

The access/monitoring processor 350 preferably measures the remaining energy in the power supply 370 using a microprocessor. The microprocessor preferably measures a signal indicative of the battery's remaining energy capacity. The microprocessor preferably performs the measurement of the remaining energy of the power supply 370 when the transceiver 360 is drawing a power or a current load from the power supply 370. For example, the transceiver 360 may be drawing power from the power supply 370 to transmit a received access signal to the remote access control panel for authorization.

The microprocessor measures the remaining energy in the power supply 370 and compares the remaining energy to a predetermined threshold. If the measured energy is above the threshold, the microprocessor reports good battery status and may simply re-measure the energy periodically. Alternatively, the microprocessor may do nothing if the measured energy is above the threshold. If the remaining energy is below the threshold, the microprocessor generates a low battery signal indicative of the fact that the energy remaining in the power supply 370 is below the threshold. Alternatively, if the power supply 370 includes multiple cells, the microprocessor may measure the power per cell and use the power per cell to measure against a threshold.

The low battery signal may be human readable or machine readable. For example, as mentioned above, the low battery signal may be sent to a remote access control panel. Alternatively, an indication of the low battery signal may be illustrated as one of the indicators 320 on the housing 310 of the WAPM 300, for example. The low battery signal may also be reported to the ACP 110.

Once the microprocessor of the access/monitoring processor 350 receives a low battery measurement for a certain predetermined number of measurements, the access/monitoring processor 350 sends a locking control signal to the locking control circuit 340. The locking control circuit 340 then secures and locks the WAPM 300 to prevent access to the access point 301. The WAPM 300 and the access point 301 preferably remain locked, in spite of access requests, until the access control processor 350 detects a new power supply 370. That is, until the energy level detected by the microprocessor is above the threshold. In one embodiment, the WAPM 300 is locked when the first low energy measurement is determined. In another embodiment, the WAPM 300 may be locked when the second, third, or later low energy measurement is determined. Alternatively, as illustrated in FIG. 5, the microprocessor may include two thresholds.

Figure 5:
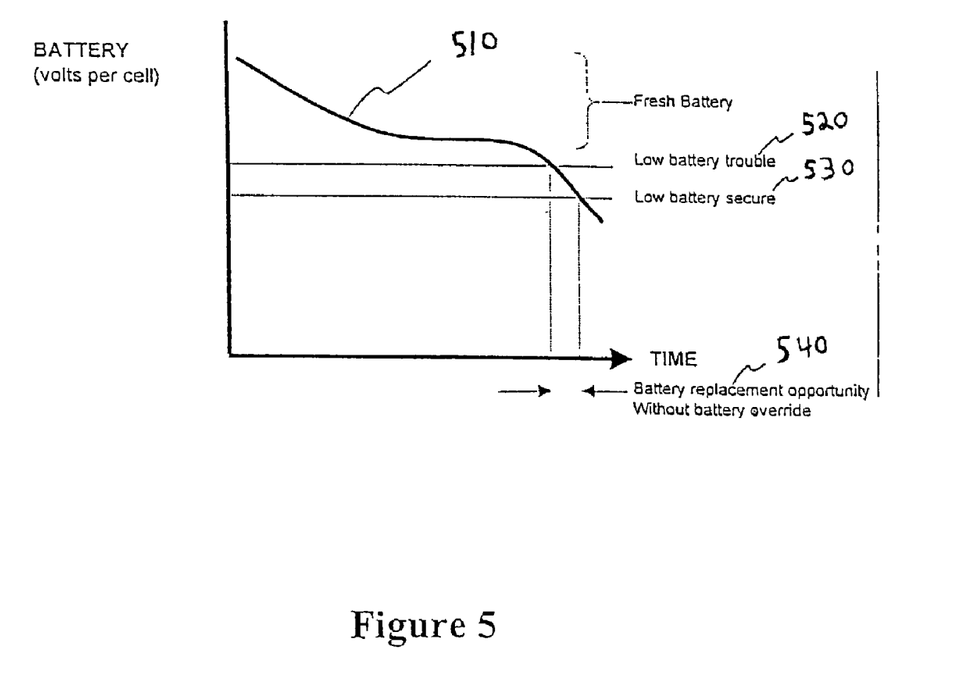
FIG. 5 illustrates a graph of the energy of the power supply over time as well as associated thresholds according to a preferred embodiment of the present invention.

FIG. 5 illustrates a graph of the energy of the power supply 370 over time as well as associated thresholds according to a preferred embodiment of the present invention. FIG. 5 includes an energy curve 510, a low battery trouble threshold 520, a low battery secure threshold 530, and a battery replacement opportunity time 540.

In FIG. 5, the vertical axis is a measurement of the energy of the power supply 370 such as in volts per cell, as indicated. The horizontal axis is a measurement of time or alternatively usage of the power supply 370, for example, the number of days the power supply 370 has been installed or the number of times the power supply has been accessed. The curve 510 illustrates the decline in the energy of the battery with use. At some time, the energy of the battery declines to the first threshold, the low battery trouble threshold 520. Once the energy of the battery declines to the low battery trouble threshold 520, the access/monitoring processor 350 sends out a low battery signal to the remote access control panel or displays the low battery condition as discussed above.

However, instead of locking out the WAPM 300 and locking control circuit 340, the locking control circuit 340 may continue to perform as it did before the low battery trouble threshold was reached. That is, access may still be granted through the WAPM 300, but an indication has been sent that the energy level of the power supply is near exhaustion. Preferably, the power supply 370 is replaced during this time so that access via the WAPM 300 is not interrupted.

Once the energy level of the power supply 370 further declines to the low battery secure threshold 530, the locking control circuit 340 locks the access point 301 and access through the WAPM 300 is no longer allowed, as described above. As above, access through the WAPM 300 is reestablished once the power supply 370 is replaced.

Additionally, the WAPM 300 may include an override port 380. The override port 380 may allow power and/or an access command to be delivered directly to the locking control circuit 340. For example, the locking control circuit 340 may have locked out the WAPM 300 because of a low battery measurement. Access may still be granted through the WAPM 300 by attaching an external device to the override port 380 to provide power and/or an access signal to the locking control circuit 340.

Figure 6:
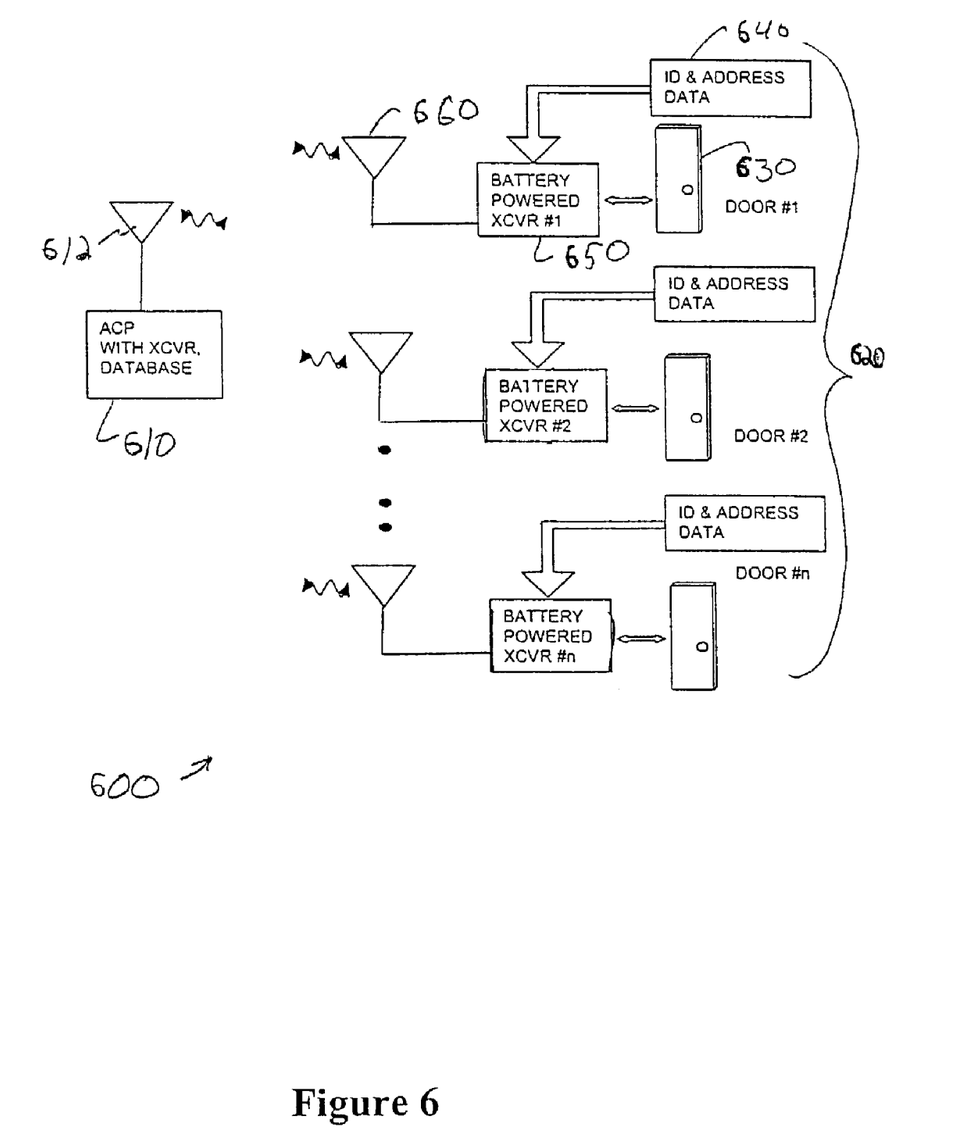
FIG. 6 illustrates a wireless access control system according to a preferred embodiment of the present invention.

FIG. 6 illustrates a wireless access control system 600 according to a preferred embodiment of the present invention. The wireless access system 600 includes an access control panel (ACP) 610 and a plurality of access points 620. Each of the access points 620 may be WAPM, for example. Each access point 620 includes a portal such as a door 630, an ID and address data processor 640, a battery powered transceiver 650 and an antenna 660. In the system 600, the access points 620 initiate access requests. The access control panel 610 includes an antenna 612, a transceiver, and an access database.

Preferably, the system 600 has the same battery power as certain other embodiments of the present invention. As mentioned above, battery powered electronic security equipment suffers from limited battery life. Devices that maximize battery life are those that minimize the power consumption associated with the performance of the device functions. The access control system 600 contains distributed, battery-powered transceivers that communicate bi-directionally with other access control devices within the security system. While it is well known that radio frequency receivers generally employ high operating currents, and therefore consume relatively high power, the preferred embodiments of the present invention present a process for minimizing power consumption at the access points 620.

Each of the access points 620 includes a battery powered, wireless transceiver, containing an address identifying the particular access point 620. The access point 620 sends and receives entrant and address identification data from controlled access points of a building, enclosure, or other secured space to the access control panel 610. The entrant or identification data is the data submitted to the access point 620 to gain access, such as card numbers or personal identification numbers (PINs), for example.

The access control panel 610 includes a database of identification, address, and access information associated with system controlled access points 620 and entrants. That is, the database lists the access points 620 and also preferably lists individual users and whether the users have access to a particular access point 620. The database may be stored on a peripheral device, such as a personal computer, for example. Additionally, the access control panel 610 may include a panel interface module transceiver to facilitate wireless communication to the distributed transceivers at the access points 620.

Preferably, communication between the ACP 610 and the access points 620 is initiated by the access points 620 rather than the ACP 610. That is, the access points 620 assume the "master" role and the ACP 610 assumes the "slave" role in normal communications. Preferably, the ACP 610 transmits a return message after initiation of communication by the access point 620. Similarly, communication between a WPIM and an access point 620 is preferably initiated by the access point 620, and the WPIM responds to requests from the access point 620.

Additionally, the access points 620 preferably include a microprocessor that powers down the transceiver 650 of the access point 620 when the transceiver 650 is not in use. That is, the microprocessor preferably removes operating power from the transmitter and receiver sections of the transceiver 650 when no communication is occurring. Preferably, the microprocessor only provides enough power to accomplish a given task.

Thus, the access points 620 conserve power by not having to respond to regular communications from the ACP 610 or a WPIM. Additionally, the access points 620 conserve power by powering down the transceiver 650 when not in use. Power may also be conserved by powering down components such as an access card reader or door motor, for example.

A dormant access point 620 may "wake up" or become re-activated at the occurrence of a certain event. For example, a request to enter or exit at the access point 620 will power up the transceiver 650. Additionally, insertion of a card into a reader at the access point 620 may activate the transceiver 650. Other events may include a predefined heartbeat or elapsed period of time and a change in state or position of a door associated with the access point 620.

A microprocessor may power up the transceiver 650 of a dormant access point 620 in the event of an abnormal communication of certain information, such as unlocking of controlled access points 620 for an emergency evacuation due to fire or other emergency. The communication may be in the form of a beacon signal initiated and continuously transmitted, or transmitted continuously with a duty cycle of less than 100%, by the ACP 610 or a peripheral device, for example. The beacon may include address information for specific controlled access points 620 and be intended for communication to specific distributed wireless transceivers 650. Thus, only certain transceivers 650 for certain access point 620 may be selectively activated.

Additionally, the microprocessor for a transceiver 650 may lie dormant and periodically power up its receiver circuitry at predetermined intervals to check for a beacon or other signal. If a command is detected, the microprocessor may determine if the command is intended for the particular transceiver 650. If so, the microprocessor executes the command. If not intended for the transceiver 650, the microprocessor does not execute the command.

Figure 7:
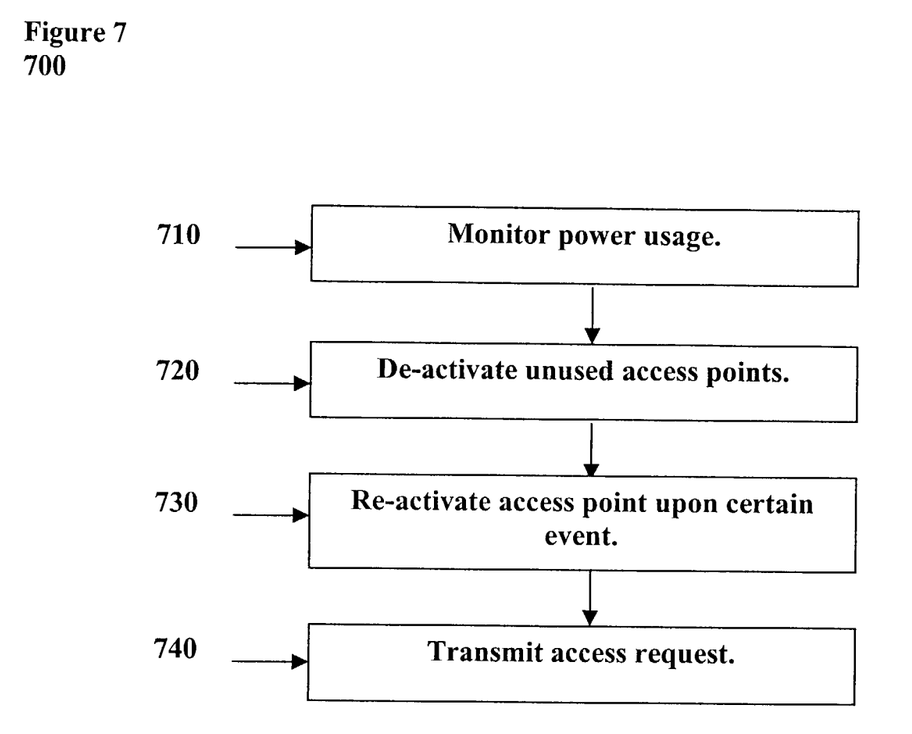
FIG. 7 illustrates a flow diagram for a method of power management in a wireless access system.

FIG. 7 illustrates a flow diagram 700 for a method of power management in a wireless access system. First, at step 710, a processor monitors usage at access points 620 or remote reader devices in the wireless access control system 600. At step 720, if the transceiver 650 or any other portion of an access point 620 or remote reader device is not in use, the processor de-activates or powers down the access point 620 or remote reader device and its components. At step 730, if a certain event occurs at the access point 620, such as a request to enter or exit, a card insertion into the remote reader device, a predefined heartbeat or interval of time, or a change in state at the access point 620, the processor re-activates or powers up the access point 620 or remote reader device and the components used in performing the requested task. At step 740, the transceiver 650 transmits an access request to the access control panel 610 to begin an access verification sequence.

The processor may also power down and lock the access point 620 if the energy level of the power supply for the access point 620 drops below a certain threshold. The access point 620 and transceiver 650 may remain locked and de-activated until the power supply is replaced, or an override may be employed to access the access point 620.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

The invention claimed is:

1. A wireless access control system adapted to control access to an access point, said system comprising:
   a remote reader device fixedly positioned adjacent the access point and operable to read an access signal in a first condition and inhibited from reading an access signal in a second condition;
   a power supply associated with the remote reader device and having an energy level;
   a processor monitoring said energy level of said power supply, said processor initiating a warning signal when said energy level of said power supply is below a first predetermined threshold and transitioning the remote reader device to the second condition when said energy level of said power supply is below a second non-zero predetermined threshold; and a transceiver coupled to the power supply and operable to transmit an RF signal indicative of the energy level of the power supply.

2. The system of claim 1, wherein said warning signal is transmitted to a remote access control panel for display to an operator.

3. The system of claim 1, wherein said remote reader device remains in the second condition until said energy level is above said predetermined threshold.

4. The system of claim 1, further comprising an override operable to transition the remote reader device from the second condition to the first condition when the energy level of the power supply is below the second predetermined threshold.

5. The system of claim 1, wherein said processor de-activates said remote reader device when said remote reader device is not in use.

6. The system of claim 1, wherein said processor de-activates said transceiver in said remote reader device when at least one of said transceiver is not in use and said energy level is below said first predetermined threshold.

7. The system of claim 6, wherein said processor activates said transceiver upon a predefined event.

8. The system of claim 1, wherein said processor reports power supply status information to a remote access control panel.

9. The system of claim 1, wherein the processor is further configured to transition the access point from a locked condition to an unlocked condition in response to an energy level that is below a second predetermined threshold.

10. The system of claim 1, wherein the processor is further configured to transition the access point from an unlocked condition to a locked condition in response to an energy level that is below a second predetermined threshold.

11. A method of power management in a wireless access control system, the wireless access control system operable to control access to an access point, said method comprising:
providing a power supply associated with the access point;
delivering power from the power supply to a remote reader device and a transceiver associated with the access point;
wireles sly transmitting from the transceiver an energy level signal indicative of the energy level of the power supply;
monitoring usage of the transceiver;
locking said remote access point when the energy level signal is below a first predetermined threshold;
de-activating said transceiver in response to one of the energy level signal being below the first predetermined threshold and said transceiver not being in use; and
re-activating said transceiver upon occurrence of a pre-defined event.

12. The method of claim 11, wherein said predefined event comprises at least one of a request to enter, a request to exit, a card insertion, a heartbeat, a time interval, a change in state, and an emergency beacon.

13. The method of claim 11, further comprising monitoring said de-activated transceiver to detect occurrence of said predefined event.

14. The method of claim 11, further comprising transmitting an access request from said transceiver to an access control panel.

15. The method of claim 11, further comprising transmitting a warning signal when an energy level of the power supply is below a second predetermined threshold.

16. The method of claim 11, wherein said remote access point is locked until said energy level is above said predetermined threshold.

17. The method of claim 11, wherein an override allows access to said locked remote access point.

18. The method of claim 11, further comprising at least two predetermined thresholds, said at least two predetermined thresholds including a warning threshold and a locking threshold.

19. The method of claim 11, further comprising reporting at least one of power supply status information and transceiver usage information to an access control panel.

20. The method of claim 11, further comprising transitioning the access point to an unlocked condition when the energy level is below a second predetermined threshold.

21. The method of claim 11, further comprising transitioning the access point to a locked condition when the energy level is below a second predetermined threshold.

22. A wireless access control system adapted to control access to a plurality of access points, said system comprising:
a remote reader device associated with each of the plurality of access points and operable in a read condition in which the remote reader device is operable to read an access signal and a locked condition in which the remote reader device inhibits access to the associated access point;
a power supply associated with the remote reader device and having an energy level;
a processor coupled to the power supply to monitor the energy level of the power supply, the processor operable to maintain the remote reader device in the read condition and initiate a warning signal when the energy level of the power supply is below a first predetermined threshold and operable to transition the remote reader device to the locked condition and generate a lock signal when the energy level of the power supply is below a second predetermined threshold; and
a transceiver coupled to the power supply and operable to transmit an RF signal indicative of the energy level of the power supply.

23. The wireless access control system of claim 22, wherein the transceiver transmits a signal indicative of the condition of the remote reader device.

24. The wireless access control system of claim 22, wherein the processor is operable to de-activate the transceiver when the energy level of the power supply is below one of the first predetermined threshold and the second predetermined threshold.

25. The system of claim 22, wherein the processor is further configured to transition the access point from a locked condition to an unlocked condition in response to an energy level that is below a second predetermined threshold.

26. The system of claim 22, wherein the processor is further configured to transition the access point from an unlocked condition to a locked condition in response to an energy level that is below a second predetermined threshold.

27. The system of claim 22, wherein said processor de-activates said transceiver when said transceiver is not in use.

* * * * *

UNITED STATES PATENT AND TRADEMARK OFFICE
CERTIFICATE OF CORRECTION

PATENT NO.         : 7,346,331 B2                                              Page 1 of 1
APPLICATION NO.    : 10/262194
DATED              : March 18, 2008
INVENTOR(S)        : Taylor et al.

It is certified that error appears in the above-identified patent and that said Letters Patent is hereby corrected as shown below:

Claim 11, Column 11, Line 43, "wires sly" should be --wirelessly--.

Signed and Sealed this

Twenty-fourth Day of February, 2009

JOHN DOLL
*Acting Director of the United States Patent and Trademark Office*